2,819,996

STABILIZED PESTICIDAL EMULSIFIER COMPOSITION

Gerard C. Riley, Philadelphia, Pa., assignor to Rohm & Haas Company, Philadelphia, Pa., a corporation of Delaware No Drawing. Application November 23, 1955
Serial No. 548,759

16 Claims. (Cl. 167—42)

The present invention is concerned with improved emulsifiers adapted to be used for the preparation of oil-in-water type of emulsions containing insecticides, herbicides and the like. The invention is particularly concerned with solutions, dispersions, or pastes, in oil, of an emulsifier of alkylene oxide condensate type which are stabilized in accordance with this invention by the addition of certain unsaturated bicyclic terpenes.

By emulsifiers of alkylene oxide condensate type is meant the emulsifiers obtained by the condensation of an alkylene oxide, e. g. ethylene oxide or propylene oxide, especially the former, and mixtures of these two oxides, with an alcohol, fatty acid, alkyphenol, amine, amide, or mercaptan containing a hydrophobic hydrocarbon group of at least 8 carbon atoms. Among these emulsifiers are the ethers, sulfides, or esters of long chain alcohols, mercaptans, or fatty acids having 8 to 18 carbon atoms or more with 6 to 100 ethylene oxide groups; the ethylene oxide condensates of long chain amines having 8 to 18 or more carbon atoms or of the amides of long chain fatty acids having 8 to 18 or more carbon atoms and containing 6 to 100 ethylene oxide units; and the alkaryl ether type of alkylene oxide condensates. The last type is the well-known broad class of emulsifiers derived from phenols or naphthols by the introduction of alkyl groups to provide a hydrophobic component and solubilizing groups including at least one alkylene oxide unit which forms an ether linkage through the phenolic hydroxyl and provides a hydrophilic component in the molecule.

Emulsifiers of alkylene oxide condensate type have heretofore been pasted or dispersed in various proportions of an oil of hydrocarbon type. Such oily pastes or dispersions generally contain the emulsifier dissolved therein and may be shipped as such to the consumers such as insecticide formulators who add various insecticides or other types of active ingredients with or without additional hydrocarbon oil. These formulators may use, but more frequently sell, the insecticide-containing composition or the like as a spray concentrate which may be directly sprayed or first added to water to form an oil-in-water emulsion of the insecticide which can be then sprayed or otherwise applied by the ultimate consumer. The intermediate formulator who sells such a spray concentrate containing the insecticide may make up a large quantity of such concentrate early in the spring in anticipation of large sales thereof. However, it has been found that when chlorinated bicyclic terpenes and octachloro-dihydro-dicyclopentadiene (Chlordane) are incorporated as the insecticide in such spray concentrates that the concentrate has insufficient stability to carry the concentrate over from one spring to that in the next year. Any unsold remainder at the end of the growing season of any given year must be discarded or reformulated with additional non-ionic emulsifier. It appears that the chlorinated bicyclic terpenes and Chlordane liberate hydrogen chloride which, in turn, apparently breaks ether linkages of the alkylene oxide condensate type of emulsifier with reduction in efficiency of emulsification action and consequent loss or difficulty to the intermediate formulator or the ultimate user.

It has now been discovered that the addition of a small amount of certain unsaturated bicyclic terpenes, more specifically α-pinene, β-pinene, α-thujene, and sabinene to the emulsifier composition in some way hinders the breakdown of the alkylene oxide condensate type of emulsifier in the presence of the chlorinated bicyclic terpenes and Chlordane. The addition of at least 10%, e. g., 10% to 50%, of the stabilizer of the invention, namely α-pinene, β-pinene, α-thujene, sabinene, or of a mixture thereof, by weight, on the weight of alkylene oxide condensate type of emulsifier, has been found to prolong the stability of such emulsifier in the presence of the chlorinated bicyclic terpenes and Chlordane (2,3,4,5,6,7,8,8-octachloro-3a,4,7,7a-tetrahydro-4,7-methanoindane) sufficiently to avoid the necessity to reformulate the chlorinated bicyclic terpene or Chlordane composition in order to provide the required emulsifiability at the time of the growing season following that for which the concentrate was originally prepared. The stability of this type of composition containing the emulsifier, the chlorinated bicyclic terpene or Chlordane, and oil may be determined by an "accelerated storage stability" test according to which the composition is stored at 60° C. until a sample thereof gives an emulsion in water which shows excessive separation of oil or excessive settling within two hours standing at normal conditions of room temperature. This is indicative of breakdown of proper emulsification capacity. Such compositions normally show breakdown within a period of 3 to 8 weeks at 60° C. whereas after the addition of the stabilizer of the present invention, they generally show no breakdown within six months at 60° C. and may last considerably longer in certain cases.

In its simplest terms, the invention involves the addition of the stabilizer of the present invention in the proportion just stated to the emulsifier or to the paste, solution, or dispersion of the emulsifier in a conventional oil solvent to form what may be termed an emulsifier composition which may be shipped to the formulator or user, who, in turn, may add additional oil and/or the insecticide or other active ingredient. The invention contemplates the use of a single emulsifier of the alkylene oxide condensate type or a mixture of one or more specific alkylene oxide condensate emulsifiers with other emulsifiers such as the various anionic sulfates or sulfonates mentioned more particularly hereinafter.

The concentrated emulsifier paste or dispersion may contain from 2% to 15% or more of the hydrocarbon oil plus the appropriate proportion of the stabilizer of the present invention in addition to the emulsifier or mixture of emulsifiers comprising at least one of the alkylene oxide condensate type. Since the stabilizers of the present invention are also capable of serving as solvents for the insecticide or other active ingredient, the usual hydrocarbon oil used in making the concentrated emulsifier paste or dispersion may be omitted. The omission of the usual hydrocarbon oil is advisable for the saving of freight when the emulsifier composition is to be shipped to a formulator or to the ultimate user. However, the emulsifier composition may contain 15% or more than 15% of hydrocarbon oil in addition to the stabilizer when shipping costs are of no concern. A spray concentrate may be produced containing from 10% to 90% of the usual hydrocarbon oil solvent, 3% to 10% of one or more emulsifiers, 4% to 60% of an insecticide, particularly the chlorinated bicyclic terpene, and an amount of the stabilizer of the present invention equal to at least 10% by weight of the alkylene oxide condensate type of emulsifier in the composition. The stabilizer may be increased to partially or completely replace the usual hydrocarbon oil solvent, as in the composition just defined. Such compositions may be sprayed directly or they may be introduced into water in which they immediately emulsify with mild agitation and then they may be sprayed or otherwise applied.

The alkylene oxide condensate type of emulsifier may be a condensation product of lauryl alcohol, oleyl alcohol or stearyl alcohol or the corresponding mercaptans with 6 to 20 or more ethylene oxide units. It may be the condensation product of lauric, oleic, palmitic, or stearic acid, or the acids of tall oil, or of the amides of such acids, with 6 to 20 or more ethylene oxide units. It may also be the condensation product of octylamine, t-octylamine, dodecylamine, or stearylamine with 6 to 20 ethylene oxide units. Any of such condensates with a higher alcohol, mercaptan, fatty acid, amide, or amine may be further reacted for the introduction of hydrophilic groups such as sulfate, sulfonate, or carboxylic acid groups.

The alkaryl ether type of emulsifier may be those derived from the hydrocarbon-substituted phenols or naphthols which are reacted with an alkylene oxide, such as ethylene oxide, propylene oxide or butylene oxide, and preferably ethylene oxide. The compounds which are described in U. S. Patent 2,213,477 are generally of this type and may be used. Typical compositions are those of a tert-octylphenol reacted with from 8 to 20 ethylene oxide units, dodecylphenol reacted with from 8 to 20 ethylene oxide units and octadecylphenol reacted with from 8 to 20 ethylene oxide units.

Representative emulsifiers of the alkaryl ether type contemplated by the present invention include those of Formulas I, II, and III:

(I) $\quad R'R^2R^3R^4Ar(O(AO)_mC_2O_4Y)_y$ (II) $\quad R'R^2R^3ArCH_2(OC_2H_4)_{m+1}OR^5$ (III)

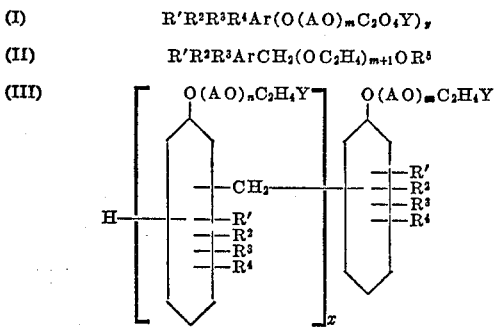

where Ar is a benzene or naphthalene nucleus, but is preferably a benzene nucleus, $R^1$ is a hydrocarbon substituent of at least 4 carbon atoms, and preferably of 8 to 18 carbon atoms, $R^2$ is H or a hydrocarbon substituent of 1 to 18 carbon atoms, $R^3$ is H or a hydrocarbon substituent of 1 to 18 carbon atoms, $R^4$ is H or a hydrocarbon substituent of 1 to 18 carbon atoms, $R^5$ is H or an alkyl group of 1 to 4 carbon atoms or—$CH_2ArR^1R^2R^3$, A is an alkylene group of 2 to 4 carbon atoms and preferably ethylene, Y is OH, —$SO_3M$, —$PO_3M$, —COOM, or —OCO—$R^6$—(COOM)$_z$, where M is an alkali metal or alkaline earth metal of group II, e. g., Be, Mg, Ca, Ba, and Sr, and $R^6$ is an alkyl or aryl radical of 1 to 7 carbon atoms, $m$ is O or an integer from 1 to 20 and is preferably at least 7, $n$ is O or an integer from 1 to 20 and is preferably at least 7, $x$ is an integer having a value of 1, 2, 3, or more, $y$ is 1 to 5 but is preferably 1, and $z$ is 1 to 2.

The compounds of Formula I include those of U. S. Patent 2,213,477 mentioned above. The compounds of Formula II include those of U. S. 2,596,091; 2,596,092; and 2,596,093. Formula III includes the compounds of Patents 2,454,541; 2,454,542; 2,454,543; 2,454,544; 2,454,545; and 2,504,064. Any of these compounds may be used separately or in combination in the emulsifiers of the present invention.

The oil or hydrocarbon oil mentioned above is intended to be limited to hydrocarbon liquids which boil within the range of 176° F. and 760° F. and are aromatic in nature or contain at least 15% of aromatic hydrocarbons boiling within the range of 176° F. and 760° F. One of the essential features of our invention resides in the use of oils or aromatic oils, as described above, in connection with two different types of surface-active agents, as hereinafter described. Typical examples of these hydrocarbon oils are benzene, toluene, xylene, monomethyl naphthalenes, dimethyl naphthalenes, trimethyl naphthalenes, tetramethyl naphthalenes, ethyl naphthalenes, pine oil and mixtures of oils containing these aromatic hydrocarbons. Likewise, petroleum fractions boiling within the above range which are aromatic in nature, containing at least 15% (and preferably 20%) aromatic hydrocarbons, may also be used, and the preferred source of these oils is from recycle stocks which have been cracked with the aid of a catalyst, such as those containing silica and alumina. The preferred boiling range of the oils used in our invention is between 176° and 570° F. Illustrative examples of petroleum hydrocarbon fractions which may be used are as follows:

|   | Oil A | Oil B | Oil C | Oil D |
|---|---|---|---|---|
| (1) A. P. I. gravity at 60° F. | 22.5 | 13.9 | 12.3 | 24.3 |
| (2) Initial boiling point (° F.) | 360 | 455 | 500 | 385 |
| (3) 50% boiling point (° F.) | 418 | 487 | 528 | 428 |
| (4) 90% boiling point (° F.) | 450 | 505 | 550 | 475 |
| (5) End boiling point (° F.) | 465 | 520 | 565 | 505 |

Another group of aromatic oils which have proven very effective in the making of our concentrates is as follows:

|   | Oil E | Oil F | Oil G |
|---|---|---|---|
| (1) A. P. I. gravity at 60° F. | 11.5–13.5 | 10.5–12.5 | 3.5–8.5 |
| (2) Initial boiling point (° F.) | 440–450 | 480–495 | 520–540 |
| (3) 50% boiling point (° F.) | 480–490 | 520–535 | 610–630 |
| (4) 90% boiling point (° F.) | 500–510 | 540–555 | 690–710 |
| (5) End boiling point (° F.) | 515–520 | 550–565 | 700–725 |

Oil E is composed of at least 75% to 80% dimethyl naphthalenes; oil F contains at least 75% to 80% trimethyl naphthalenes; and oil G contains at least 75% to 80% tetramethyl naphthalenes. These oils may be prepared by mixing the corresponding alkyl-substituted naphthalenes with other petroleum hydrocarbons, or they may be separated as cuts from hydrocarbon oil fractions high in alkyl-substituted naphthalenes.

As mentioned above, the emulsifier may also contain strictly anionic types, such as alkylaryl sulfonates of which the alkali metal or alkaline earth metal of group II (e. g. beryllium, magnesium, calcium, barium, and strontium) salts of dodecylbenzene sulfonic acid, dodecyltoluene sulfonic acid, dodecylxylene sulfonic acid or dodecylnaphthalene sulfonic acid. Also the alkali metal or alkaline earth metal salts of fatty alcohol sulfates such as lauryl alcohol sulfate, stearyl alcohol sulfate, and the sulfonates or sulfates of long-chain unsaturated aliphatic hydrocarbons, such as sulfonated castor oil, may be used.

The insecticides which may be incorporated in the oil-emulsifier composition include Chlordane, 1,2-dihydroxy-4,5,6,7,8,8 - hexahalo - 4,7 - methano - 3a,4,7,7a - tetrahydroindane of U. S. Patent 2,528,654 or any chlorinated polycyclic terpenes such as the chlorinated pinene of U. S. 2,579,296; the chlorinated camphane of U. S. 2,579,297; the chlorinated camphene of U. S. 2,565,471 (Toxaphene); the chlorinated bornyl chloride of U. S. 2,579,298; the chlorinated isobornyl chloride of U. S. 2,579,299; the chlorinated pinane of U. S. 2,579,300; the chlorinated fenchene of U. S. 2,579,301; the chlorinated camphor and fenchone of U. S. 2,657,164.

The oil composition, as pointed out above, containing the emulsifier, the oil, the stabilizer, and the insecticide may be sprayed directly for insecticidal purposes, for which purpose generally a concentration of 2% to 10% and preferably 5% of the chlorinated bicyclic terpene or other insecticide may be used. When such a spray concentrate is introduced into water to produce an oil-in-water emulsion, the proportions may be such as to provide an emulsion containing from 0.05 to 10% or more of the insecticide. The emulsion may then be sprayed or otherwise applied at this concentration.

The addition of the stabilizer of the present invention to the emulsifier composition containing a small amount of the hydrocarbon oil solvent together with the emulsifiers generally is accompanied by incidental advantages. The stabilizer may serve as a blending or coupling agent, particularly when the emulsifying material comprises a plurality of different types of emulsifing agents.

It is to be noted that the stabilizing action is obtained, so far as is now known, from a specific group of terpenes, specifically unsaturated bicyclic terpenes which is a group now known, for all practical purposes, to consist of α-pinene, β-pinene, α-thujene, and sabinene. Of these, the two pinenes are preferred from the standpoints of inexpensive cost and ready availability. They may be incorporated into the emulsifier compositions by the addition of the relatively pure compounds as available commercially or by the addition of gum turpentine or wood turpentine. The specificity of this group of terpenes in their stabilizing effect on the emulsifier compositions is shown by the fact that little or no stabilizing action is obtained by the addition of corresponding (or even larger than corresponding) amounts of myrcene, dipentene, and pine oil.

The following examples are illustrative of the invention:

Example 1

(a) Seven parts by weight of a predominantly aromatic solvent naphtha is mixed with 60 parts by weight of a tert-octylphenoxypolyethoxyethanol having an average of about 10 ethylene oxide units per molecule and 9 parts by weight of α-thujene are added as a stabilizer for the emulsifier.

(b) Part (a) is repeated substituting α-pinene for the α-thujene.

(c) Part (b) is repeated replacing the emulsifier with an ethylene oxide condensate of the fatty acids derived from tall oil containing an average of 15 ethylene oxide units per molecule.

(d) Part (b) is repeated replacing the emulsifier with an ethylene oxide condensate of lauryl alcohol containing an average of 20 oxyethylene units.

(e) Part (b) is repeated replacing the emulsifier with an ethylene oxide condensate of stearic acid containing an average of 20 oxyethylene units.

Example 2

(a) Eight parts by weight of the solvent naphtha of Example 1(a) are mixed with 40 parts by weight of a di-secamylphenol (which has been condensed with formaldehyde in a mole ratio of 2 of the phenol to 1 of the formaldehyde and reacted with ethylene oxide to provide an average of about 20 moles of ethylene oxide in the molecule). Then 10 parts by weight of β-pinene are added to provide a stabilizer for the emulsifier.

(b) Part (a) is repeated except that the β-pinene is replaced with 12 parts of gum turpentine (containing about 30% β-pinene and about 60% α-pinene).

(c) Part (a) is repeated substituting for the β-pinene 14 parts of wood turpentine (containing about 80% of α-pinene and traces of β-pinene).

(d) Part (a) is repeated except that the β-pinene is replaced with 20 parts of sabinene.

Example 3

To the composition of Example 2(a), 16 parts by weight of the emulsifier of Example 1(a) are added and also 26 parts by weight of a calcium salt of dodecyltoluene sulfonate wherein a small proportion of unsulfonated oils may also be present as is common in such commercial products.

The concentrates of Examples 1, 2, and 3 are emulsifiers which may be shipped to formulators who may use them as emulsifiers to produce many compositions including herbicidal compositions as well as insecticidal compositions. With Chlordane and other insecticidal materials of the chlorinated bicyclic terpene type, the stabilizer of the present invention therein hinders the breakdown of the alkylene oxide condensate type of emulsifier in the presence of the hydrogen chloride liberated by the bicyclic terpene or Chlordane as pointed out hereinbefore. In compounding the emulsifiers of Examples 1, 2, and 3 with insecticides or other active agents, additional oil solvent may be added. The resulting composition may be formulated for direct spraying or for self-emulsification in water to provide a spray material.

Example 4

An emulsifiable concentrate is prepared by mixing 84 parts by weight of a hydrocarbon oil boiling substantially between 450° and 520° F. and composed primarily of aromatic hydrocarbons, 5 parts by weight of the calcium salt of dodecylbenzene monosulfonic acid, 5 parts by weight of a condensation product of one mole of octylphenol and about 12 moles of ethylene oxide, 5 parts by weight of the chlorinated camphene (Toxaphene) of U. S. Patent 2,565,471, and 1 part by weight of β-pinene. The composition thus obtained may be sprayed as such and remains stable at least 8 months under the accelerated ageing (60° C.) procedure mentioned above. The same composition without β-pinene is stable only about 63 days under the same ageing conditions. Preferably it is added to water in which it is self-emulsifiable in almost any proportion desired, producing a long-lasting oil-in-water emulsion which is sprayable.

Example 5

Sixty parts by weight of an oil boiling substantially between 440° and 520° F. and composed primarily of dimethylnaphthalene and a small amount of naphthalene hydrocarbons, 5 parts by weight of a calcium salt of an alkyl-substituted benzene monosulfonic acid wherein the alkyl chain contains from 10 to 14 carbon atoms, 5 parts by weight of a condensation product of one mole of di-amylphenol and an average of 10 moles of ethylene oxide, 5 parts by weight of the chlorinated pinane of U. S. Patent 2,579,300, and one part by weight of α-pinene are mixed to form an emulsifiable insecticidal concentrate which has stability comparable to that of Example 4. This concentrate may be mixed with water in a great variety of proportions for the formation of an oil-in-water emulsion containing from 1% to 10% by weight of the insecticidal material.

Example 6

A similar composition is prepared replacing the condensation product of diamylphenol and ethylene oxide with the condensation product of one mole of dihexylphenol with an average of 12 moles of ethylene oxide.

Example 7

An emulsifiable concentrate is prepared by mixing 60 parts by weight of the chlorinated camphene (Toxaphene) of U. S. Patent 2,565,471, 35 parts by weight of kerosene, 2 parts of an ethylene oxide condensate of tall oil fatty acids containing an average of about 10 oxyethylene units per molecule of acid, 2 parts of the calcium salt of dodecylbenzene monosulfonic acid, and 1 part of β-pinene. The concentrate has stability comparable to that of Example 4 and may be stored many months before diluting with water for use.

Example 8

An emulsifiable concentrate is prepared by mixing 46 parts by weight of Chlordane, 49 parts of kerosene, 2 parts of an ethylene oxide condensate of lauryl alcohol having an average of 20 oxyethylene units per molecule of alcohol, 2 parts of the calcium salt of dodecylbenzene monosulfonic acid, and 1 part of β-pinene. The concentrate has stability comparable to that of Example 4 and may be stored many months before diluting with water for use.

The stabilization of alkylene oxide condensate types of emulsifiers is especially valuable when this type of emulsifier, particularly of non-ionic character, is used in a blend with an anionic type such as a surface-active organic sulfate or sulfonate of the types mentioned above, Examples 3 to 7 illustrating this blended emulsifier system. In such blended emulsifiers, the ratio between the two types of emulsifying agents generally must be kept within a relatively narrow range to obtain optimum results. Consequently, deterioration of even a small part of the alkylene oxide type of emulsifier is generally troublesome in that it shifts the ratio out of the optimum range into a poorly operating range where the reduction in emulsification capability may be so great as to render the emulsifier practically ineffective.

It is to be understood that changes and variations may be made without departing from the spirit and scope of the invention as defined in the appended claims.

I claim:

1. An insecticidal composition comprising 10% to 90% by weight of an oil solvent essentially consisting of hydrocarbons boiling within the range of 176° to 760° F., 3% to 10% by weight of emulsifying material comprising at least one alkylene oxide condensate type of emulsifier containing at least one group selected from the group consisting of oxyethylene and oxypropylene groups, an unsaturated bicyclic terpene selected from the group consisting of α-pinene, β-pinene, α-thujene, and sabinene as a stabilizer in an amount of 10% to 50% by weight of the total alkylene oxide condensate component of the emulsifying material, and 4% to 60% by weight of a member of the group consisting of Chlordane and chlorinated bicyclic terpenes as an active agent.

2. An insecticidal composition comprising 10% to 90% by weight of an oil solvent essentially consiting of hydrocarbons boiling within the range of 176° F. and 760° F., 3% to 10% by weight of emulsifying material comprising at least one ethylene oxide condensate of a fatty acid having at least 8 carbon atoms and containing 6 to 100 oxyethylene units, an unsaturated bicyclic terpene selected from the group consisting of α-pinene, β-pinene, α-thujene, and sabinene as a stabilizer in an amount of at least 10% by weight of the total alkylene oxide condensate component of the emulsifying material, and 4% to 60% by weight of a chlorinated bicyclic terpene.

3. An insecticidal composition comprising 10% to 90% by weight of an oil solvent essentially consisting of hydrocarbons boiling within the range of 176° F. and 760° F., 3% to 10% by weight of emulsifying material comprising an alkylphenoxy-polyethoxyethanol having at least eight oxyethylene units in which the alkyl group has from 8 to 18 carbon atoms, an unsaturated bicyclic terpene selected from the group consisting of α-pinene, β-pinene, α-thujene, and sabinene as a stabilizer in an amount of at least 10% by weight of the total alkylene oxide condensate component of the emulsifying material, and 4% to 60% by weight of a chlorinated bicyclic terpene.

4. A composition as defined in claim 3 in which the terpene is camphene and the stabilizer is β-pinene.

5. An insecticidal composition comprising 10% to 90% by weight of an oil solvent essentially consisting of hydrocarbons boiling within the range of 176° F. and 760° F., 3% to 10% by weight of emulsifying material comprising an alkylphenoxy-polyethoxyethanol having at least eight oxyethylene units in which thte alkyl group has from 8 to 18 carbon atoms and a salt of a metal selected from the group consisting of alkali metals and alkaline earth metals and of an alkylaryl sulfonic acid in which the alkyl group has from 8 to 18 carbon atoms, an unsaturated bicyclic terpene selected from the group consisting of α-pinene, β-pinene, α-thujene, and sabinene as a stabilizer in an amount of at least 10% by weight of the total alkylene oxide condensate component of the emulsifying material, and 4% to 60% by weight of a chlorinated bicyclic terpene.

6. An insecticidal composition comprising 10% to 90% by weight of an oil solvent essentially consisting of hydrocarbons boiling within the range of 176° F. and 760° F., 3% to 10% by weight of emulsifying material comprising an alkylphenoxy-polyethoxyethanol having at least eight oxyethylene units in which thte alkyl group has from 8 to 18 carbon atoms and a salt of a metal selected from the group consisting of alkali metals and alkaline earth metals and of an alkylaryl sulfonic acid in which the alkyl group has from 8 to 18 carbon atoms, an unsaturated bicyclic terpene selected from the group consisting of α-pinene, β-pinene, α-thujene, and sabinene as a stabilizer in an amount of at least 10% by weight of the total alkylene oxide condensate component of the emulsifying material and 4% to 60% by weight of a 2,3,4,5,6,7,8,8-octachloro-3a,4,7,7a-tetrahydro-4,7 - methanoindane.

7. An emulsifier composition comprising an alkylene oxide condensate type of emulsifier having a hydrophobic component linked to a hydrophilic component and containing at least one group selected from the group consisting of oxyethylene and oxypropylene groups, and a member selected from the group consisting of α-pinene, β-pinene, α-thujene, and sabinene, the amount of said member being from 10% to 50% by weight of the aforesaid emulsifier.

8. An emulsifier composition comprising a hydrocarbon oil solvent consisting of hydrocarbons boiling within the range of 176° to 760° F., an alkylene oxide condensate type of emulsifier having a hydrophobic component linked to a hydrophilic component and containing at least one group selected from the group consisting of oxyethylene and oxypropylene groups, and a member selected from the group consisting of α-pinene, β-pinene, α-thujene, and sabinene, the amount of said solvent being at least 2% to 15% of the total weight of said solvent, the aforesaid emulsifier and said member, and the amount of said member being from 10% to 50% by weight of the aforesaid emulsifier.

9. An emulsifier composition comprising a hydrocarbon oil solvent consisting of hydrocarbons boiling within the range of 176° to 760° F., an alkylene oxide condensate type of emulsifier having a hydrophobic component linked to a hydrophilic component and containing at least one group selected from the group consisting of oxyethylene and oxypropylene groups, and α-pinene in an amount of 10% to 50% by weight of the alkylene oxide condensate type of emulsifier, the amount of said solvent being at least 2% to 15% of the total weight of said solvent, the aforesaid emulsifier, and the α-pinene.

10. An emulsifier composition comprising a hydrocarbon oil solvent consisting of hydrocarbons boiling within the range of 176° to 760° F., an alkylene oxide condensate type of emulsifier having a hydrophobic component linked to a hydrophilic component and containing at least one group selected from the group consisting of oxyethylene and oxypropylene groups, and β-pinene in an amount of 10% to 50% by weight of the alkylene oxide condensate type of emulsifier, the amount of said solvent being at least 2% to 15% of the total weight of said solvent, the aforesaid emulsifier, and the β-pinene.

11. An emulsifier composition comprising a hydrocarbon oil solvent consisting of hydrocarbons boiling within the range of 176° to 760° F., an alkylene oxide condensate type of emulsifier having a hydrophobic component linked to a hydrophilic component and containing at least one group selected from the group consisting of oxyethylene and oxypropylene groups, and α-thujene in an amount of 10% to 50% by weight of the alkylene oxide condensate type of emulsifier, the amount of said solvent being at least 2% to 15% of the total weight of said solvent, the aforesaid emulsifier, and the α-thujene.

12. An emulsifier composition comprising a hydrocarbon oil solvent consisting of hydrocarbons boiling within the range of 176° to 760° F., an alkylene oxide condensate type of emulsifier having a hydrophobic component linked to a hydrophilic component and containing at least one group selected from the group consisting of oxyethylene and oxypropylene groups, and sabinene in an amount of 10% to 50% by weight of the alkylene oxide condensate type of emulsifier, the amount of said solvent being at least 2% to 15% of the total weight of said solvent, the aforesaid emulsifier, and the sabinene.

13. An emulsifier composition comprising a hydrocarbon oil solvent consisting of hydrocarbons boiling within the range of 176° to 760° F., an emulsifier comprising an ethylene oxide condensate of a fatty acid having at least 8 carbon atoms and containing 6 to 50 oxyethylene units, and an unsaturated bicyclic terpene selected from the group consisting of α-pinene, β-pinene, α-thujene, and sabinene as a stabilizer in an amount of 10% to 50% by weight of the ethylene oxide condensate, the amount of said solvent being at least 2% to 15% of the total weight of said solvent, the aforesaid emulsifier, and the terpene.

14. An emulsifier composition comprising a hydrocarbon oil solvent consisting of hydrocarbons boiling within the range of 176° to 760° F., emulsifying material comprising an alkaryl ether type of emulsifier selected from the group consisting of those having Formulas I, II, and III following, and an unsaturated bicyclic terpene selected from the group consisting of α-pinene, β-pinene, α-thujene, and sabinene as a stabilizer in an amount of 10% to 50% by weight of the ether type of emulsifier, the amount of said solvent being at least 2% to 15% of the total weight of said solvent, the aforesaid emulsifier, and the terpene, the aforesaid formulas being (I)             $R'R^2R^3R^4Ar(O(AO)_mC_2H_4Y)_y$ (II)            $R'R^2R^3ArCH_2(OC_2H_4)_{m+1}OR^5$ (III)

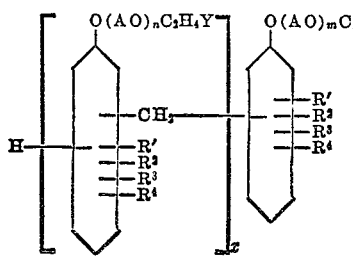

where Ar is selected from the group consisting of benzene and naphthalene nuclei, R' is a hydrocarbon substituent of at least 4 carbon atoms, $R^2$ is selected from the group consisting of H and hydrocarbon substituents of 1 to 18 carbon atoms, $R^3$ is selected from the group consisting of H and hydrocarbon substituents of 1 to 18 carbon atoms, $R^4$ is selected from the group consisting of H and hydrocarbon substituents of 1 to 18 carbon atoms, $R^5$ is selected from the group consisting of H, alkyl groups of 1 to 4 carbon atoms, and —$CH_2ArR'R^2R^3$, A is an alkylene group of 2 to 4 carbon atoms, Y is selected from the group consisting of OH, —$SO_3M$, —$PO_3M$, —COOM, and —OCO—$R^6$—$(COOM)_z$, where M is selected from the group consisting of alkali metals and alkaline earth metals of Group II, and $R^6$ is selected from the group consisting of alkyl and aryl radicals of 1 to 7 carbon atoms, $m$ is selected from the group consisting of O and an integer from 1 to 20, $n$ is selected from the group consisting of O and an integer from 1 to 20, $x$ is an integer having a value of 1 to 3, $y$ is an integer having a value of 1 to 5, and $z$ is an integer having a value of 1 to 2.

15. A composition as defined in claim 14 in which the emulsifying material comprises an alkylphenoxypolyethoxyethanol having at least eight oxyethylene units in which the alkyl group has from 8 to 18 carbon atoms.

16. An emulsifier composition comprising an alkylene oxide type of emulsifier having a hydrophobic component linked to a hydrophilic component, an anionic type of emulsifier having a hydrophobic component linked to a hydrophilic component and containing at least one group selected from the group consisting of oxyethylene and oxypropylene groups, and an unsaturated bicyclic terpene selected from the group consisting of α-pinene, β-pinene, α-thujene, and sabinene as a stabilizer in an amount of 10% to 50% by weight of the alkylene oxide type of emulsifier.

References Cited in the file of this patent
UNITED STATES PATENTS

| | | |
|---|---|---|
| 2,096,737 | Dinley | Oct. 26, 1937 |
| 2,462,146 | Walcott | Feb. 22, 1949 |
| 2,552,187 | Kosmin | May 8, 1951 |
| 2,592,540 | Cassil et al. | Apr. 15, 1952 |
| 2,696,453 | Sanders et al. | Dec. 7, 1954 |